(12) United States Patent
Liu

(10) Patent No.: US 11,974,292 B2
(45) Date of Patent: Apr. 30, 2024

(54) DOWNLINK CONTROL INFORMATION RECEIVING METHOD AND APPARATUS, AND STORAGE MEDIUM

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 468 days.

(21) Appl. No.: 17/242,753

(22) Filed: Apr. 28, 2021

(65) Prior Publication Data

US 2021/0250923 A1 Aug. 12, 2021

Related U.S. Application Data

(63) Continuation of application No. PCT/CN2018/112776, filed on Oct. 30, 2018.

(51) Int. Cl.
  *H04W 72/23* (2023.01)
  *H04L 5/00* (2006.01)
  *H04W 72/0453* (2023.01)

(52) U.S. Cl.
  CPC ........... *H04W 72/23* (2023.01); *H04L 5/0053* (2013.01); *H04W 72/0453* (2013.01)

(58) Field of Classification Search
  CPC ... H04L 5/001; H04L 5/0053; H04L 27/0006; H04W 72/0453; H04W 72/20; H04W 72/23
  See application file for complete search history.

(56) References Cited

U.S. PATENT DOCUMENTS

| | | |
|---|---|---|
| 2018/0146439 A1 | 5/2018 | Kim et al. |
| 2018/0183551 A1 | 6/2018 | Chou et al. |
| 2018/0184410 A1 | 6/2018 | John Wilson et al. |
| 2018/0279289 A1 | 9/2018 | Islam et al. |
| 2018/0279331 A1 | 9/2018 | Shaheen et al. |

(Continued)

FOREIGN PATENT DOCUMENTS

| | | |
|---|---|---|
| CN | 106162900 A | 11/2016 |
| CN | 107948988 A | 4/2018 |

(Continued)

OTHER PUBLICATIONS

English version of International Search Report in the International Application No. PCT/CN2018/112776, dated Aug. 8, 2019.

(Continued)

*Primary Examiner* — Gary Mui
(74) *Attorney, Agent, or Firm* — Finnegan, Henderson, Farabow, Garrett & Dunner, L.L.P.

(57) ABSTRACT

A method for receiving downlink control information (DCI) includes: receiving bandwidth part (BWP) configuration information transmitted by an access network device, the BWP configuration information configuring a target BWP located in an unlicensed spectrum and comprises m sub-bands, m being a positive integer greater than 1; determining the m sub-bands of the target BWP according to the BWP configuration information; monitoring a target sequence on the m sub-bands respectively; and monitoring DCI on all or part of the m sub-bands after the target sequence is detected.

16 Claims, 14 Drawing Sheets

(56) References Cited

U.S. PATENT DOCUMENTS

| | | | |
|---|---|---|---|
| 2018/0279353 A1 | 9/2018 | Shaheen et al. | |
| 2018/0288790 A1 | 10/2018 | Kim et al. | |
| 2019/0268883 A1* | 8/2019 | Zhang | H04W 16/14 |
| 2019/0274162 A1* | 9/2019 | Zhang | H04W 74/0808 |
| 2020/0112484 A1* | 4/2020 | Sun | H04L 5/003 |
| 2021/0007101 A1* | 1/2021 | Tooher | H04W 72/0446 |
| 2021/0092622 A1* | 3/2021 | Tiirola | H04L 1/0038 |
| 2021/0092772 A1* | 3/2021 | Nakashima | H04L 27/0006 |
| 2021/0250923 A1* | 8/2021 | Liu | H04W 72/23 |

FOREIGN PATENT DOCUMENTS

| | | |
|---|---|---|
| CN | 108282291 A | 7/2018 |
| CN | 108282872 A | 7/2018 |
| CN | 108366413 A | 8/2018 |
| CN | 108370573 A | 8/2018 |
| CN | 108513356 A | 9/2018 |
| CN | 108513360 A | 9/2018 |
| CN | 108632789 A | 10/2018 |
| WO | WO 2018/175577 A1 | 9/2018 |

OTHER PUBLICATIONS

English version of the Written Opinion of the International Search Authority in the International Application No. PCT/CN2018/112776, dated Aug. 8, 2019.

First Office Action of Chinese Application No. 201880001830.2, dated Mar. 3, 2021.

Nokia, Nokia Shanghai Bell, on the Frame structure and Wideband operation for NR-U, 3GPP TSG RAN WG1 Meeting #94bis, R1-1810613, Chengdu, China, Oct. 8-12, 2018, 13 pages.

Qualcomm Incorporated, DL signals and channels for NR-U, 3GPP TSG RAN WG1 Meeting #94bis, R1-1811250, Chengdu, China, Oct. 8-12, 2018, 9 pages.

Extended European Search Report in European Application No. 18939033.9, dated Oct. 29, 2021.

\* cited by examiner

DOWNLINK CONTROL INFORMATION RECEIVING METHOD AND APPARATUS, AND STORAGE MEDIUM

CROSS-REFERENCE TO RELATED APPLICATION

This is a continuation application of International Application No. PCT/CN2018/112776, filed on Oct. 30, 2018, the content of which is hereby incorporated by reference in its entirety.

BACKGROUND

In the 5G New Radio (NR) system, the concept of bandwidth part (BWP) is introduced, that is, for a terminal, a frequency band is partitioned into a plurality of BWPs. The terminal is configured with a plurality of BWPs within a time period, but only one BWP activated at the same time, and the terminal only monitors downlink control information (DCI) signaling on the activated BWP.

After acquiring the activated BWP configured by the base station for the terminal, the terminal may monitor a physical downlink control channel (PDCCH) transmitted by the base station on the activated BWP and blindly detect DCI. Then, the terminal may receive downlink data transmitted by the base station on a physical downlink shared channel (PDSCH) according to the received DCI, or transmit uplink data to the base station through a physical uplink shared channel (PUSCH) according to the received DCI.

In addition, related standards organizations also proposed 5G New Radio Unlicensed (NR-U) technology for communication using NR technology on the unlicensed spectrum. Before using the unlicensed spectrum, the channel detection needs to be performed through the Listen Before Talk (LBT) mechanism firstly, only if the detection result is that the channel is in an idle state, the unlicensed spectrum can be used.

Considering the characteristics of multi-carrier operation and NR-U, it is possible to operate with a basic bandwidth of 20 MHz, for example, an available bandwidth of 80 MHz is divided into four 20 MHz carriers. However, for four 20 MHz carriers, there is currently no solution for how to schedule and use the carriers between an access network device of the NR-U and the terminal.

SUMMARY

According to a first aspect of embodiments of the present disclosure, a method for receiving downlink control information (DCI), performed by a terminal, comprises: receiving bandwidth part (BWP) configuration information transmitted by an access network device, the BWP configuration information configuring a target BWP located in an unlicensed spectrum and comprises m sub-bands, m being a positive integer greater than 1; determining the m sub-bands of the target BWP according to the BWP configuration information; monitoring a target sequence on the m sub-bands respectively; and monitoring DCI on all or part of the m sub-bands after the target sequence is detected.

According to a second aspect of embodiments of the present disclosure, a method for transmitting downlink control information (DCI), performed by an access network device, comprises: transmitting bandwidth part (BWP) configuration information to a terminal, the BWP configuration information configuring a target BWP located in an unlicensed spectrum and comprises m sub-bands, m being a positive integer greater than 1; performing Listen Before Talk (LBT) on the m sub-bands, and determining n target sub-bands according to a LBT result, n being a positive integer not greater than m; transmitting a target sequence on the n target sub-bands; and transmitting DCI to the terminal on all or part of the m sub-bands.

According to a third aspect of embodiments of the present disclosure, a terminal comprises: a processor; and a memory for storing instructions executable by the processor. The processor is configured to: receive bandwidth part (BWP) configuration information transmitted by an access network device, the BWP configuration information configuring a target BWP located in an unlicensed spectrum and comprises m sub-bands, m being a positive integer greater than 1; determine the m sub-bands of the target BWP according to the BWP configuration information; monitor a target sequence on the m sub-bands respectively; and monitor DCI on all or part of the m sub-bands after the target sequence is detected.

According to a fourth aspect of embodiments of the present disclosure, an access network device comprises: a processor; and a memory for storing instructions executable by the processor. The processor is configured to: transmit bandwidth part (BWP) configuration information to a terminal, the BWP configuration information configuring a target BWP located in an unlicensed spectrum and comprises m sub-bands, m being a positive integer greater than 1; perform Listen Before Talk (LBT) on the m sub-bands, and determine n target sub-bands according to a LBT result, n being a positive integer not greater than m; transmit a target sequence on the n target sub-bands; and transmit DCI to the terminal on all or part of the m sub-bands.

It is to be understood that the foregoing general description and the detailed description below are merely exemplary and explanatory, and do not limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the disclosure. Instead, they are merely examples of devices and methods consistent with aspects related to the disclosure as recited in the appended claims.

Figure 1:
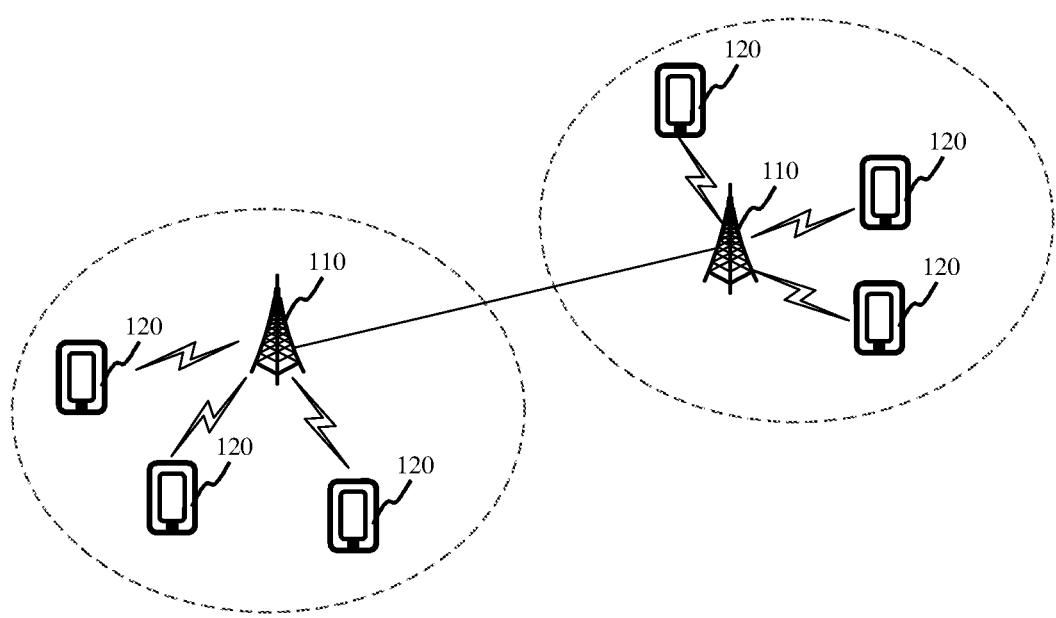
FIG. 1 is a schematic diagram illustrating a communication system according to an exemplary embodiment.

FIG. 1 is a schematic diagram illustrating a mobile communication system according to an exemplary embodiment. The mobile communication system may include an access network device 110 and a terminal 120.

The access network device 110 is deployed in an access network. The access network in a 5G NR system may be referred to as NG-RAN (New Generation-Radio Access Network). The access network device 110 and the terminal 120 communicate with each other via a certain type of air interface technology, for example, may communicate with each other via cellular technology.

The access network device 110 is a device deployed in the access network to provide wireless communication function for the terminal 120. The access network device 110 may include various forms of macro base stations, micro base stations, relay stations, access points, and the like. In systems employing different radio access technologies, the names of devices having base station functions may vary, for example, in the 5G NR system, referred to as gNodeB or gNB. With the evolution of communication technologies, the name "base station" may change. For convenience of description, in the present embodiments of the present disclosure, the above-described devices for providing a wireless communication function for the terminal 120 are collectively referred to as a base station.

One or more terminals 120 may be distributed within a cell managed by each access network device 110. The terminal 120 may include various types of handheld devices, vehicle-mounted devices, wearable devices, computing devices, that having wireless communication functions, or other processing devices connected to a wireless modem, as well as various forms of user equipment (UE), mobile station (MS), terminal device, and the like. For convenience of description, in the embodiments of the present disclosure, the above-mentioned devices are collectively referred to as a terminal.

The "5G NR system" in the embodiments of the present disclosure may also be referred to as a 5G system or an NR system, and the meaning thereof will be understood by the person skilled in the art. The technical solution described in the embodiments of the present disclosure may be applicable to the 5G NR system, may also be applicable to a subsequent evolution system of the 5G NR system.

In the embodiments of the present disclosure, the access network device 110 and the terminal 120 may communicate with each other by utilizing an unlicensed spectrum. That is, the access network device 110 and the terminal 120 may be the access network device 110 and the terminal 120 in a scenario of the NR-U independent networking.

Figure 2:
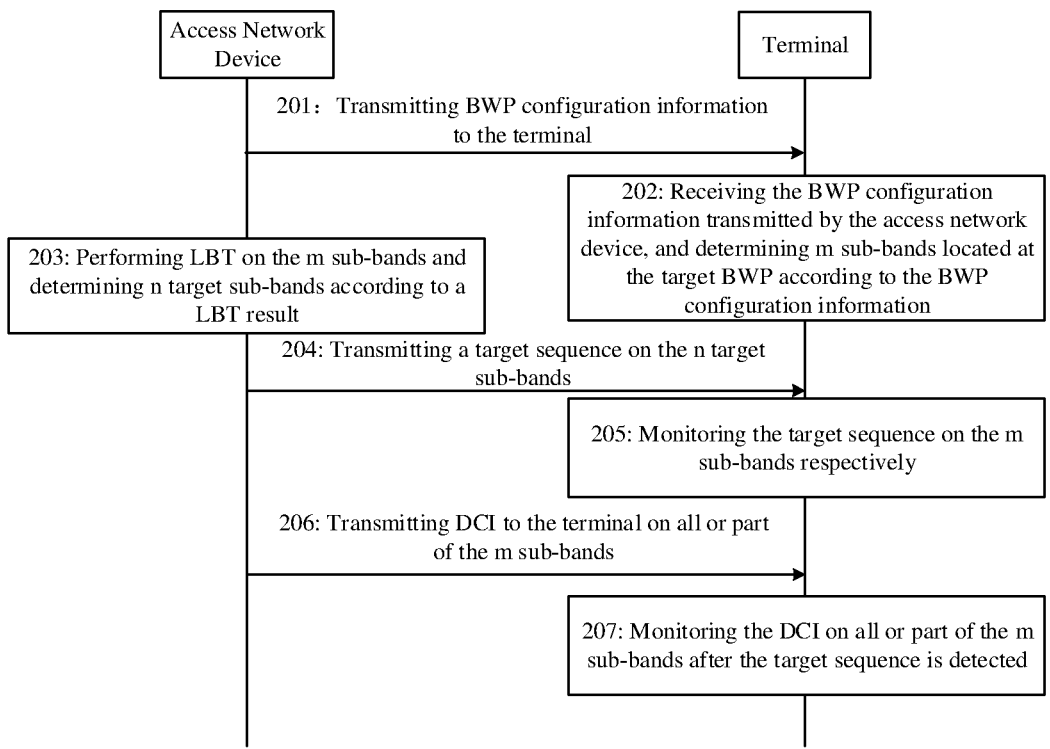
FIG. 2 is a flowchart illustrating a method for receiving DCI according to an exemplary embodiment.

FIG. 2 illustrates a flowchart of a method for receiving the DCI according to an exemplary embodiment. The method may be applied to the communication system illustrated in FIG. 1, and may include the following steps.

At step 201, an access network device transmits BWP configuration information to a terminal.

The BWP configuration information is used for configuring a target BWP which is located in the unlicensed spectrum and includes m sub-bands. The target BWP may be one BWP, and the target BWP may be an uplink BWP and/or a downlink BWP. The target BWP is a BWP belonging to the unlicensed spectrum.

Figure 3:
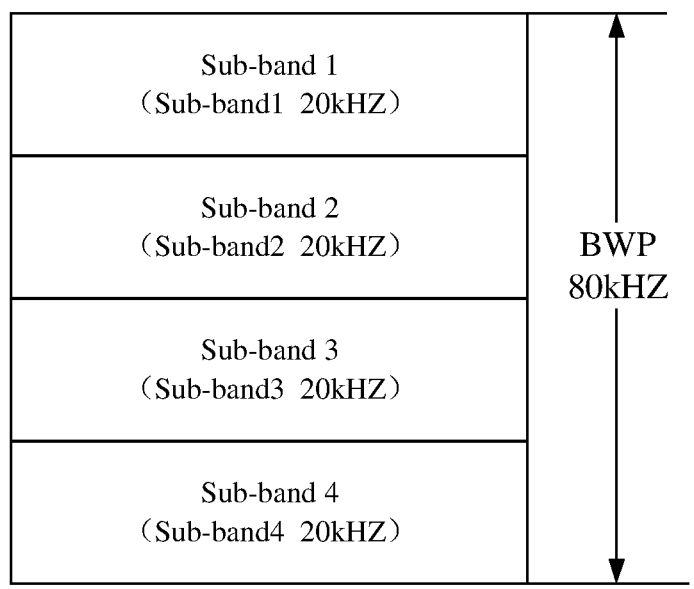
FIG. 3 is a schematic diagram illustrating BWP according to an exemplary embodiment.

The target BWP may include m sub-bands, and m is a positive integer greater than 1, such as 2, 3, 4, 5, 6, 8, etc. For example, m=4 is illustrated in FIG. 3. Assuming that the bandwidth occupied by the target BWP is 80 kHZ, the target BWP includes four sub-bands: sub-band 1, sub-band 2, sub-band 3, and sub-band 4, each of which occupies 20 kHZ. For example, the m sub-bands are consecutive in the frequency domain That is, the m sub-bands are consecutive m sub-bands in the frequency domain.

In an embodiment, the access network device sends a radio resource control (RRC) message to the terminal, and the RRC message carries the BWP configuration information.

In an embodiment, the BWP configuration information is semi-static configuration information. The semi-static configuration information refers to keep using the current configuration information before the configuration information transmitted next time is received.

At step 202, the terminal receives the BWP configuration information transmitted by the access network device, and determines m sub-bands of the target BWP according to the BWP configuration information.

In an embodiment, the terminal receives the RRC message transmitted by the access network device, and acquires the BWP configuration information from the RRC message.

The terminal determines the target BWP located in the unlicensed spectrum according to the BWP configuration information. In an embodiment, the terminal also determines the m sub-bands according to the BWP configuration information.

In an embodiment, division information for the m sub-bands is carried in the BWP configuration information, or the division information for the m sub-bands is predefined by a communication protocol, or the division information for the m sub-bands is transmitted by the access network device through other control information.

At step 203, the access network device performs LBT on the m sub-bands and determines n target sub-bands according to a LBT result.

Since the m sub-bands are unlicensed spectrum, the access network device performs LBT on the m sub-bands respectively to determine whether each of the m sub-bands is occupied. After obtaining the LBT result, the access network device determines the n target sub-bands.

In an embodiment, the n target sub-bands are all sub-bands on which the LBT is successful among the m sub-bands. In an embodiment, the n target sub-bands are sub-bands for transmitting downlink DCI, and the n target sub-bands are all or part of the sub-bands on which the LBT is successful.

At step 204, the access network device transmits a target sequence on the n target sub-bands.

The target sequence may be a pseudo-random sequence that occupies relatively few time-frequency resources. For example, the target sequence occupies only one symbol in the time domain.

In an embodiment, the time domain position for transmitting the target sequence is pre-determined by the communication protocol. For example, when there needs the transmission, the transmission is performed on the first symbol of each sub-frame.

At step 205, the terminal monitors the target sequence on the m sub-bands respectively.

In an embodiment, the terminal monitors the target sequence on each of the m sub-bands respectively, and determines several sub-bands on which the target sequence is successfully monitored.

At step 206, the access network device transmits DCI to the terminal on the n target sub-bands.

At step 207, the terminal monitors the DCI on all or part of the m sub-bands after the target sequence is detected.

In the above embodiments, by dividing the BWP into m sub-bands, after performing LBT on the m sub-bands, the access network device firstly transmits a target sequence on n sub-bands on which LBT is successful, and then transmits DCI on the n sub-bands on which LBT is successful. After the target sequence is detected, the terminal monitors the DCI on all or part of the m sub-bands, thereby effectively reducing the search times and the search power consumption of the terminal on the PDCCH, and avoiding unnecessary power and battery consumption of the terminal.

In different embodiments of the present disclosure, the target sequence may have different functions. In an embodiment, the target sequence is configured to trigger the terminal to receive DCI in the PDCCH. In an embodiment, the target sequence is configured to identify the sub-bands on which LBT is successful, i.e., the available sub-bands. In an embodiment, the target sequence is configured to identify the sub-bands on which the DCI is transmitted. Examples of these embodiments are described below.

Figure 4:
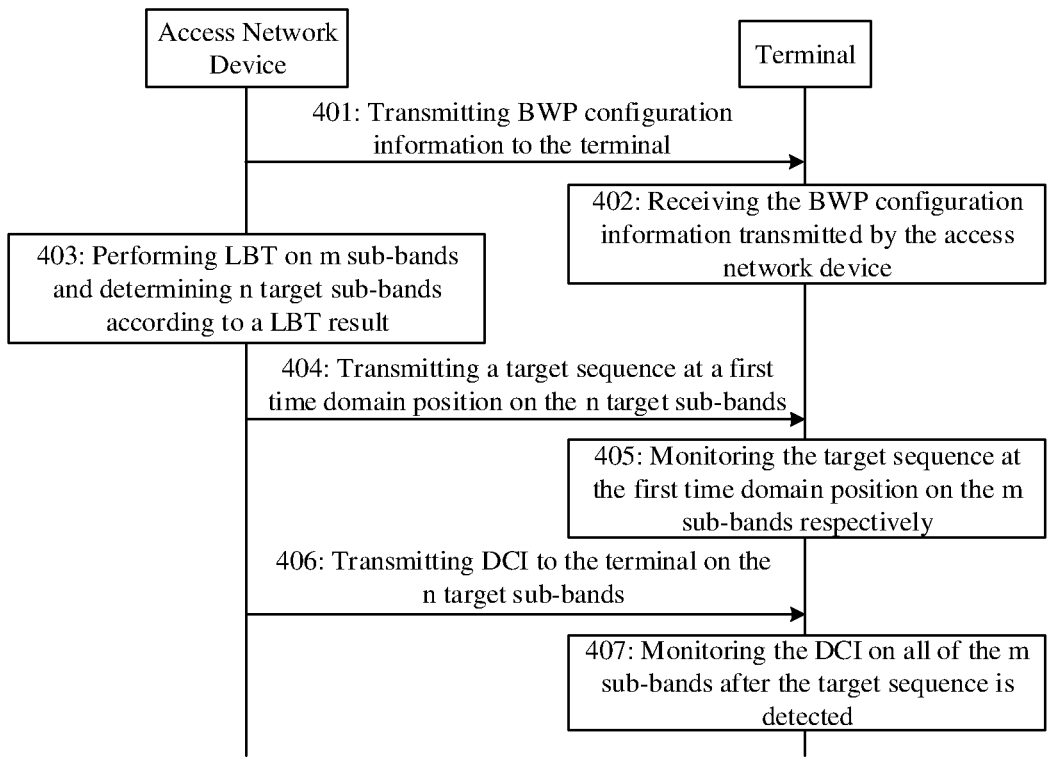
FIG. 4 is a block diagram illustrating a device for receiving DCI according to an exemplary embodiment.

FIG. 4 illustrates a flowchart of a method for receiving the DCI according to an exemplary embodiment. The method may be applied to the communication system illustrated in FIG. 1, and include the following steps.

At step 401, the access network device transmits BWP configuration information to the terminal.

The BWP configuration information is used for configuring the target BWP which is located in the unlicensed spectrum and includes m sub-bands. The target BWP may be one BWP, and the target BWP may be an uplink BWP and/or a downlink BWP. The target BWP is a BWP belonging to the unlicensed spectrum.

The target BWP includes m sub-bands, and m is a positive integer greater than 1, such as 2, 3, 4, 5, 6, 8, etc. In an embodiment, the m sub-bands are consecutive in the frequency domain. That is, the m sub-bands are consecutive m sub-bands in the frequency domain.

In an embodiment, the access network device sends an RRC message to the terminal, and the RRC message carries the BWP configuration information.

In an embodiment, the BWP configuration information is semi-static configuration information. The semi-static configuration information refers to keep using the current configuration information before the configuration information transmitted next time is received.

At step 402, the terminal receives the BWP configuration information transmitted by the access network device, and determines m sub-bands of the target BWP according to the BWP configuration information.

In an embodiment, the terminal receives the RRC message transmitted by the access network device, and acquires the BWP configuration information from the RRC message.

The terminal determines the target BWP located in the unlicensed spectrum according to the BWP configuration information. In an embodiment, the terminal also determines the m sub-bands according to the BWP configuration information.

In an embodiment, the division information for the m sub-bands is carried in the BWP configuration information, or the division information for the m sub-bands is predefined by the communication protocol, or the division information for the m sub-bands is transmitted by the access network device through other control information.

At step 403, the access network device performs LBT on the m sub-bands and determines n target sub-bands according to a LBT result.

In an embodiment, since the m sub-bands are unlicensed spectrum, the access network device performs LBT on the m sub-bands respectively to determine whether each of the m sub-bands is occupied. The access network device determines at least one of the m sub-bands as the target sub-band when the LBT result is that there is one sub-band that is an unoccupied sub-band.

In an embodiment, the access network device determines the n target sub-bands in the k sub-bands on which LBT is successful. m, k, and n are all positive integers, k is not greater than m, and n is not greater than k.

In an embodiment, the access network device determines one or more of the k sub-bands as the target sub-bands. For example, the access network device determines any one of the k sub-bands as the target sub-band, determines the first sub-band as the target sub-band, or determines the last sub-band as the target sub-band.

In an embodiment, the access network device determines all of the k sub-bands as the target sub-bands.

At step 404, the access network device transmits a target sequence at the first time domain position on the n target sub-bands.

The target sequence may be a pseudo-random sequence that occupies relatively few time-frequency resources. For example, the target sequence occupies only one symbol in the time domain.

In an embodiment, the first time domain position for transmitting the target sequence is pre-determined by the communication protocol. For example, when there needs the transmission, the transmission is performed on the first symbol of each sub-frame. For example, the first time domain position is pre-configured by the access network device during the configuration of the target BWP. For example, the first time domain position is carried in the BWP configuration information.

At step 405, the terminal monitors the target sequence at the first time domain position on the m sub-bands respectively.

At step 406, the access network device transmits DCI to the terminal on the n target sub-bands.

In an embodiment, the access network device transmits a Control-Resource SET (CORESET) for the m sub-bands to the terminal in advance. The CORESET carries the candidate time-frequency resource positions, transmitting the PDCCH, on each sub-band, for example, the frequency band occupied in the PDCCH frequency domain and the number of OFDM symbols occupied in the PDCCH time domain, etc.

At step 407, the terminal monitors the DCI on each of the m sub-bands after the target sequence is detected.

After the target sequence is detected, the terminal monitors the DCI on all of the m sub-bands. In an embodiment, the terminal pre-receives the CORESET for the m sub-bands transmitted by the access network device, and determines the candidate time-frequency resource positions of the PDCCH according to the CORESET, so as to determine the search space of the PDCCH, and then performs blind detection and reception of the DCI according to the search space of the PDCCH.

Figure 5:
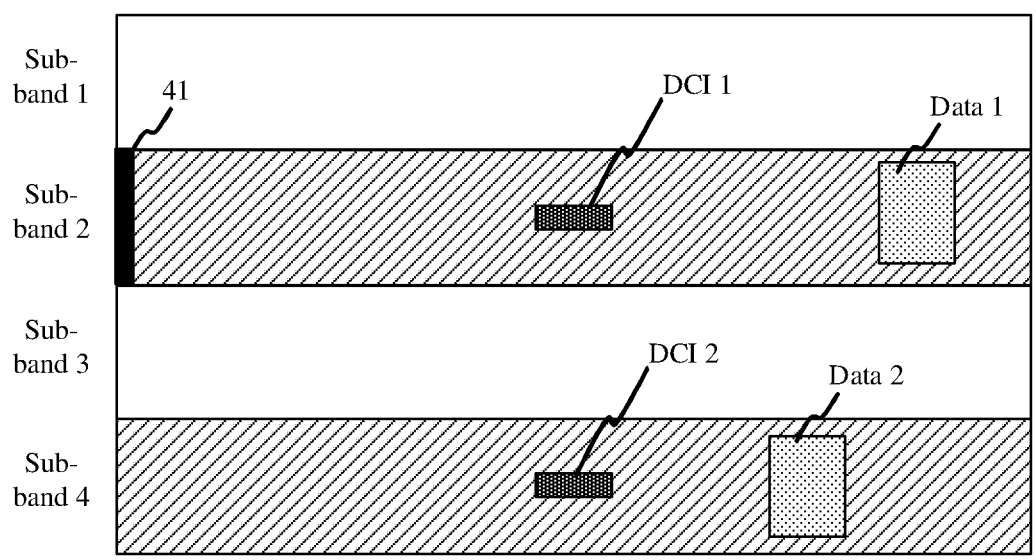
FIG. 5 is a schematic diagram illustrating a method for receiving DCI according to an exemplary embodiment.

Referring to FIG. 5, it is assumed that the access network device configures four sub-bands for the terminal, and LBT is successful on the sub-band 2 and the sub-band 4, that is, the sub-band 2 and the sub-band 4 are not occupied, and the sub-band 1 and the sub-band 3 are occupied. At this time, the access network device may determine the sub-band 2 as the target sub-band, and transmit the target sequence 41 on a first symbol of the sub-band 2. The first symbol is the time domain position which is pre-determined by the communication protocol. The terminal is prepared to receive the DCI after the target sequence 41 is detected on the sub-band 2. The access network device transmits a DCI 1 on the sub-band 2, and the terminal receives or transmits data 1 on the sub-band 2 according to the DCI 1 after the DCI 1 is received on the sub-band 2. The access network device also transmits a DCI 2 on the sub-band 4, and the terminal receives or transmits a data 2 on the sub-band 4 according to the DCI 2 after the DCI 2 is received on the sub-band 4.

In the above embodiment, after the access network device transmits the target sequence on the target sub-band, the terminal is prepared to receive the DCI only after the target sequence is detected. That is, the target sequence is used for triggering the terminal to start receiving the DCI, so that the access network device and the terminal only need to activate one BWP. At the same time, when the target sequence is not transmitted due to that LBT performed by the access network device on all sub-bands fails, the terminal does not need to perform blind detection for the PDCCH, thereby effectively reducing the search times and search power consumption of the terminal on the PDCCH, and avoiding unnecessary power and battery consumption of the terminal.

Figure 6:
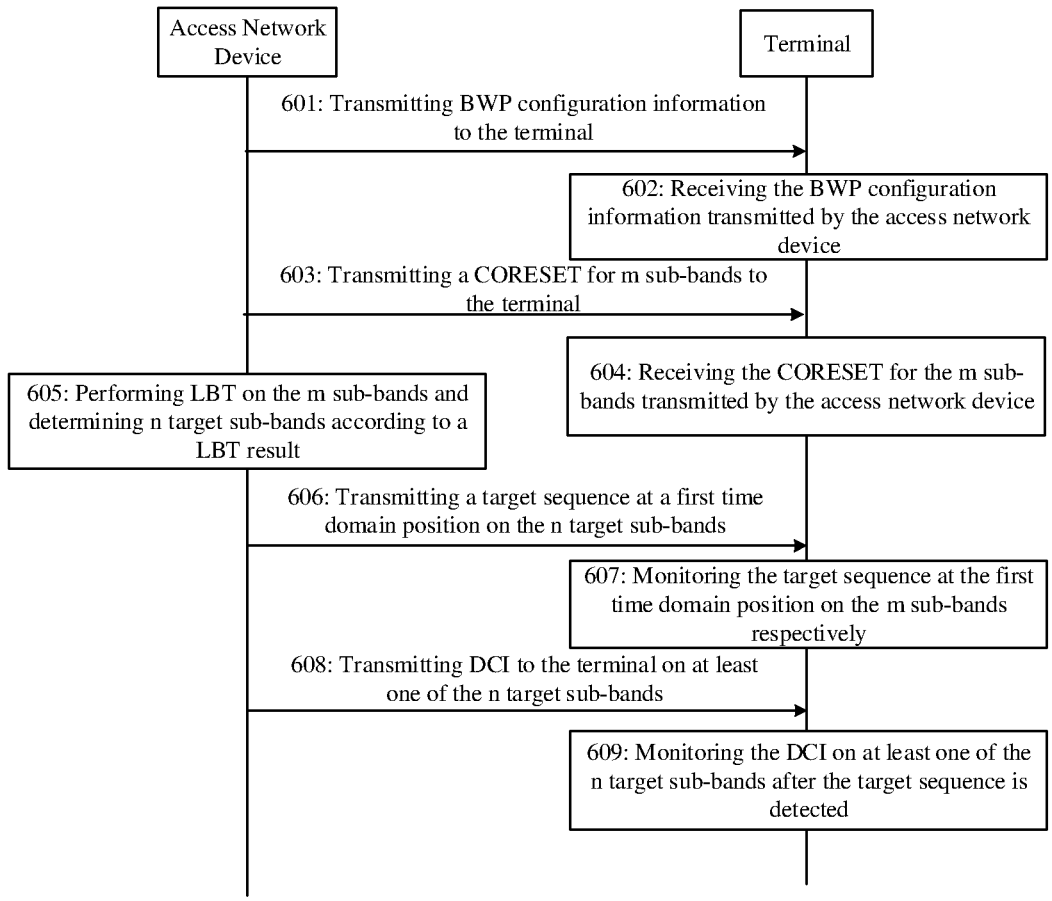
FIG. 6 is a schematic diagram illustrating a method for receiving DCI according to an exemplary embodiment.

FIG. 6 illustrates a flowchart of a method for receiving the DCI according to an exemplary embodiment. The method may be applied to the communication system illustrated in FIG. 1, and may include the following steps.

At step 601, the access network device transmits BWP configuration information to the terminal.

The BWP configuration information is used to configure the target BWP which is located in the unlicensed spectrum and includes m sub-bands. The target BWP may be one BWP, and the target BWP may be an uplink BWP and/or a downlink BWP. The target BWP is a BWP belonging to the unlicensed spectrum. In an embodiment, the m sub-bands are consecutive in the frequency domain. That is, the m sub-bands are consecutive m sub-bands in the frequency domain.

The target BWP includes m sub-bands, and m is a positive integer greater than 1, such as 2, 3, 4, 5, 6, 8, etc.

In an embodiment, the access network device transmits an RRC message to the terminal, and the RRC message carries the BWP configuration information.

In an embodiment, the BWP configuration information is semi-static configuration information. The semi-static configuration information refers to keep using the current configuration information before the configuration information transmitted next time is received.

At step 602, the terminal receives the BWP configuration information transmitted by the access network device, and determines m sub-bands of the target BWP according to the BWP configuration information.

In an embodiment, the terminal receives the RRC message transmitted by the access network device, and acquires the BWP configuration information from the RRC message.

The terminal determines the target BWP located in the unlicensed spectrum according to the BWP configuration information. In an embodiment, the terminal also determines m sub-bands according to the BWP configuration information.

In an embodiment, the division information for the m sub-bands is carried in the BWP configuration information, or the division information for the m sub-bands is predefined by the communication protocol, or the division information for the m sub-bands is transmitted by the access network device through other control information.

At step 603, the access network device transmits a control resource set (CORESET) for the m sub-bands to the terminal.

In an embodiment, the access network device transmits the CORESET for the m sub-bands to the terminal in advance. The CORESET carries the candidate time-frequency resource positions, transmitting the PDCCH, on each sub-band, for example, the frequency band occupied in the PDCCH frequency domain and the number of OFDM symbols occupied in the PDCCH time domain, etc.

At step 604, the terminal receives the CORESET for the m sub-bands transmitted by the access network device.

In an embodiment, the terminal receives the CORESET for the m sub-bands transmitted by the access network device, and determines the candidate time-frequency resource positions of the PDCCH according to the CORESET.

At step 605, the access network device performs LBT on the m sub-bands and determines n sub-bands on which the LBT is successful as the n target sub-bands.

In an embodiment, since the m sub-bands are unlicensed spectrum, the access network device performs LBT on the m sub-bands respectively to determine whether each of the m sub-bands is occupied. The access network device determines all of the n sub-bands as the target sub-bands when the LBT result is that there are n sub-bands that are unoccupied sub-bands.

At step 606, the access network device transmits a target sequence at the first time domain position on the n target sub-bands.

The target sequence may be a pseudo-random sequence that occupies relatively few time-frequency resources. For example, the target sequence occupies only one symbol in the time domain.

In an embodiment, the first time domain position for transmitting the target sequence is pre-determined by the communication protocol. For example, when there needs the transmission, the transmission is performed on the first symbol of each sub-frame. In an embodiment, the first time domain position is pre-configured by the access network device during the configuration of the target BWP. For example, the first time domain position is carried in the BWP configuration information.

At step 607, the terminal monitors the target sequence at the first time domain position on the m sub-bands respectively, and determines the n sub-bands on which the target sequence has been monitored.

In an embodiment, the terminal monitors the target sequence at the first time domain position on the m sub-bands respectively, and determines the n sub-bands on which the target sequence has been monitored. When the target sequence is detected on a certain sub-band, the terminal determines that the target sub-band is a sub-band on which LBT is successful.

At step 608, the access network device transmits DCI to the terminal on at least one of the n target sub-bands.

In an embodiment, the access network device transmits the DCI on each of the n target sub-bands. In an embodiment, the DCI on each sub-band carries the scheduling information for the time-frequency resource of the sub-band.

In an embodiment, if the amount of information that the DCI needs to carry is relatively small, the access network device only transmits the DCI on part of the n target sub-bands. The DCI carries the scheduling information for the time-frequency resource of the n target sub-bands.

At step 609, the terminal monitors the DCI on at least one of the n target sub-bands after the target sequence is detected.

In an embodiment, when the terminal determines the search space of the PDCCH on the n target sub-bands according to the CORESET, the DCI on the n target sub-bands is received by blind detection according to the search space of the PDCCH.

Figure 7:
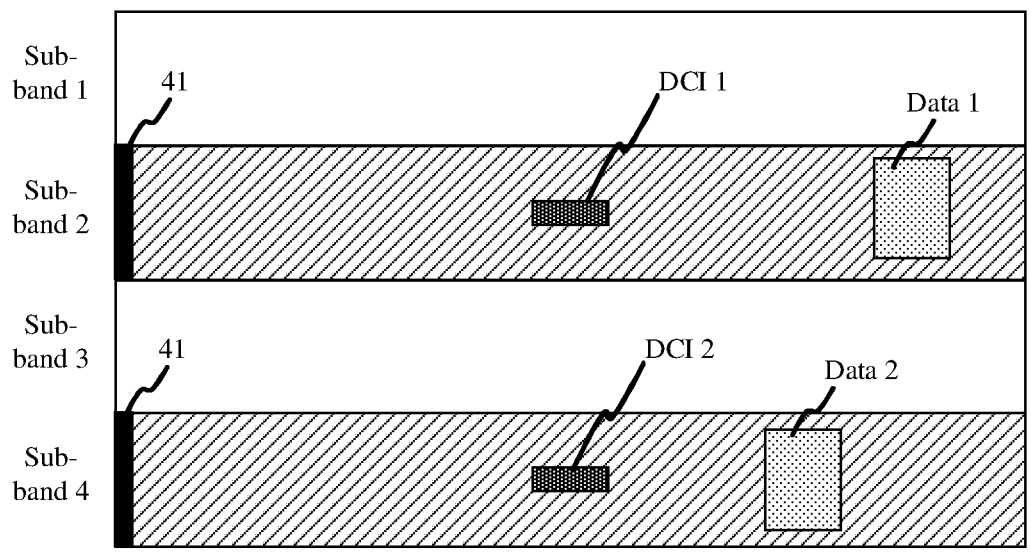
FIG. 7 is a block diagram illustrating a device for receiving DCI according to an exemplary embodiment.

Referring to FIG. 7, it is assumed that the access network device configures four sub-bands for the terminal, and LBT is successful on the sub-band 2 and the sub-band 4, that is, the sub-band 2 and the sub-band 4 are not occupied, and the sub-band 1 and the sub-band 3 are occupied. At this time, the access network device may determine the sub-band 2 and the sub-band 4 as the target sub-bands, and transmit the target sequence 41 on the first symbol of the sub-band 2 and the sub-band 4. The first symbol is the time domain position which is pre-determined by the communication protocol. The terminal is prepared to receive the DCI on the sub-band 2 and the sub-band 4 after the target sequence 41 is detected on the sub-band 2 and the sub-band 4. The access network device transmits a DCI 1 on the sub-band 2, and the terminal receives or transmits data 1 on the sub-band 2 according to the DCI 1 after the DCI 1 is received on the sub-band 2. The access network device also transmits a DCI 2 on the sub-band 4, and the terminal receives or transmits a data 2 on the sub-band 4 according to the DCI 2 after the DCI 2 is received on the sub-band 4.

Figure 8:
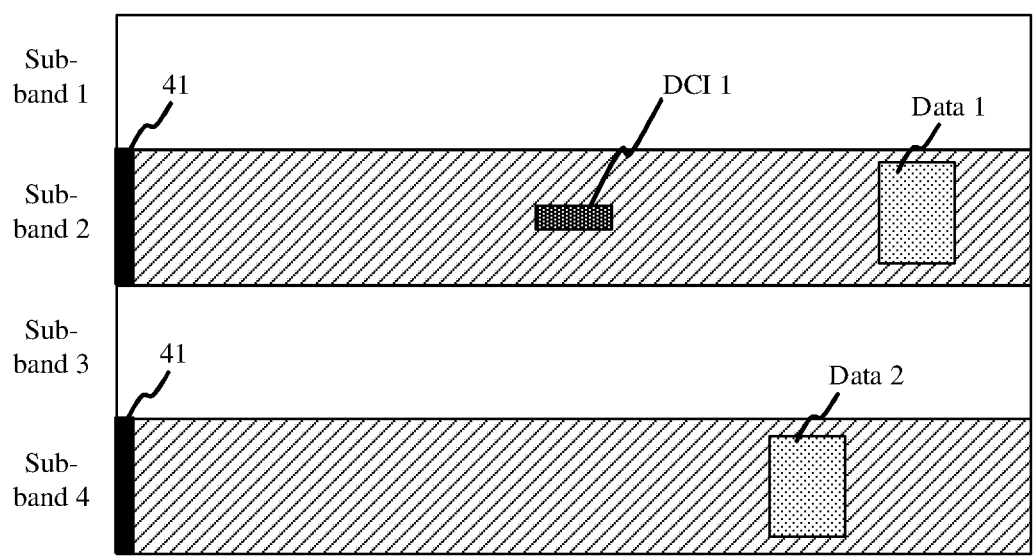
FIG. 8 is a schematic diagram illustrating a method for receiving DCI according to an exemplary embodiment.

Referring to FIG. 8, it is assumed that the access network device configures four sub-bands for the terminal, and LBT is successful on the sub-band 2 and the sub-band 4, that is, the sub-band 2 and the sub-band 4 are not occupied, and the sub-band 1 and the sub-band 3 are occupied. At this time, the access network device may determine the sub-band 2 and the sub-band 4 as the target sub-bands, and transmit the target sequence 41 on the first symbol of the sub-band 2 and the sub-band 4. The first symbol is the time domain position which is pre-determined by the communication protocol. The terminal is prepared to receive the DCI on the sub-band 2 and the sub-band 4 after the target sequence 41 is detected on the sub-band 2 and the sub-band 4. When only one piece of DCI is needed to carry all the scheduling information, the access network device transmits the DCI 1 on the sub-band 2 (or the sub-band 4). After the DCI 1 is received on the sub-band 2, the terminal receives or transmits the data on the sub-band 2 and the sub-band 4 according to the DCI 1.

In the above embodiments, the access network device determines the n target sub-bands on which LBT is successful, and transmits the target sequence on the n target sub-bands. The terminal can learn the n target sub-bands on which LBT is successful after the target sub-bands is detected, and is prepared to receive the DCI only on the n target sub-bands, so that the access network device and the terminal only need to activate one BWP. At the same time, the access network device only needs to transmit the target sequence on the n target sub-bands, and the terminal only needs to perform blind detection for the PDCCH on the n target sub-bands, thereby effectively reducing the search times and the search power consumption of the terminal on the PDCCH, and avoiding unnecessary power and battery consumption of the terminal.

Figure 9:
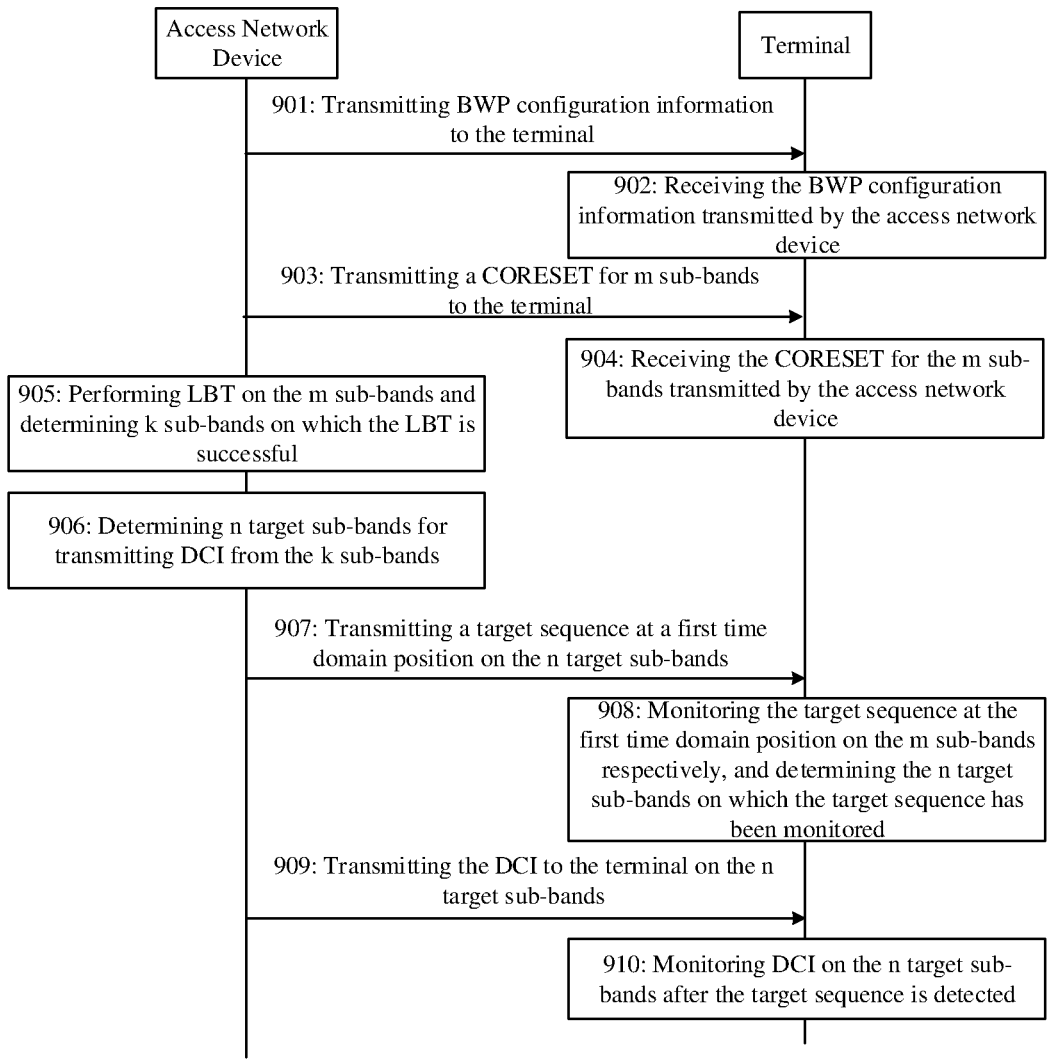
FIG. 9 is a block diagram illustrating a device for receiving DCI according to an exemplary embodiment.

FIG. 9 illustrates a flowchart of a method for receiving the DCI according to an exemplary embodiment. The method may be applied to the communication system illustrated in FIG. 1, and may include the following steps.

At step 901, the access network device transmits BWP configuration information to the terminal.

The BWP configuration information is used to configure the target BWP which is located in the unlicensed spectrum and includes m sub-bands. The target BWP may be one BWP, and the target BWP may be an uplink BWP and/or a downlink BWP. The target BWP is a BWP belonging to the unlicensed spectrum. In an embodiment, the m sub-bands are consecutive in the frequency domain. That is, the m sub-bands are consecutive m sub-bands in the frequency domain.

In an embodiment, the target BWP includes m sub-bands, and m is a positive integer greater than 1, such as 2, 3, 4, 5, 6, 8, etc.

In an embodiment, the access network device sends an RRC message to the terminal, and the RRC message carries the BWP configuration information.

In an embodiment, the BWP configuration information is semi-static configuration information. The semi-static configuration information refers to keep using the current configuration information before the configuration information transmitted next time is received.

At step 902, the terminal receives the BWP configuration information transmitted by the access network device, and determines m sub-bands of the target BWP according to the BWP configuration information.

In an embodiment, the terminal receives the RRC message transmitted by the access network device, and acquires the BWP configuration information from the RRC message.

The terminal determines the target BWP located in the unlicensed spectrum according to the BWP configuration information. In an embodiment, the terminal also determines m sub-bands according to the BWP configuration information.

In an embodiment, the division information for the m sub-bands is carried in the BWP configuration information, or the division information for the m sub-bands is predefined by the communication protocol, or the division information for the m sub-bands is transmitted by the access network device through other control information.

At step 903, the access network device transmits a CORESET for the m sub-bands to the terminal.

The access network device transmits the CORESET for the m sub-bands to the terminal in advance. The CORESET carries the candidate time-frequency resource positions, transmitting the PDCCH, on each sub-band, for example, the frequency band occupied in the PDCCH frequency domain and the number of OFDM symbols occupied in the PDCCH time domain, etc.

At step 904, the terminal receives the CORESET for the m sub-bands transmitted by the access network device.

In an embodiment, the terminal receives the CORESET for the m sub-bands transmitted by the access network device, and determines the candidate time-frequency resource positions of the PDCCH according to the CORESET.

At step 905, the access network device performs LBT on the m sub-bands and determines k sub-bands on which LBT is successful.

In an embodiment, since the m sub-bands are unlicensed spectrum, the access network device performs LBT on the m sub-bands respectively to determine whether each of the m sub-bands is occupied. It is assumed that the LBT result is that there are k sub-bands that are unoccupied sub-bands.

At step 906, the access network device determines the n target sub-bands for transmitting DCI from the k sub-bands.

The access network device determines all or part of the k sub-bands as the n target sub-bands. In an embodiment, the access network device determines all or part of the k sub-bands as the n target sub-bands according to the data amount of the DCI to be transmitted.

In an embodiment, the access network device determines the n target sub-bands from the k sub-bands on which the LBT is successful. m, k, and n are all positive integers, k is not greater than m, and n is not greater than k. The n target sub-bands are sub-bands for transmitting DCI.

At step 907, the access network device transmits a target sequence at the first time domain position on the n target sub-bands.

The target sequence may be a pseudo-random sequence that occupies relatively few time-frequency resources. For example, the target sequence occupies only one symbol in the time domain.

In an embodiment, the first time domain position for transmitting the target sequence is pre-determined by the communication protocol. For example, when there needs the transmission, the transmission is performed on the first symbol of each sub-frame. In an embodiment, the first time domain position is pre-configured by the access network device during the configuration of the target BWP. For example, the first time domain position is carried in the BWP configuration information.

At step 908, the terminal monitors the target sequence at the first time domain position on the m sub-bands respectively, and determines the n sub-bands on which the target sequence has been monitored.

In an embodiment, the terminal monitors the target sequence at the first time domain position on the m sub-bands respectively, and determines the n sub-bands on which the target sequence has been monitored. When the target sequence has been monitored on a certain sub-band, the terminal determines that the target sub-band is a sub-band on which the LBT is successful.

At step 909, the access network device transmits DCI to the terminal on the n target sub-bands.

In an embodiment, the access network device transmits the DCI on each of the n target sub-bands.

In an embodiment, the DCI on each sub-band carries the scheduling information for time-frequency resources on the sub-band. In an embodiment, the DCI on the n target sub-bands carries the scheduling information for time-frequency resources on the k target sub-bands.

At step 910, the terminal monitors DCI on the n target sub-bands after the target sequence is detected.

In an embodiment, when the terminal determines the search space of the PDCCH on the n target sub-bands according to CORESET, the DCI on the n target sub-bands is received by blind detection according to the search space of the PDCCH.

Figure 10:
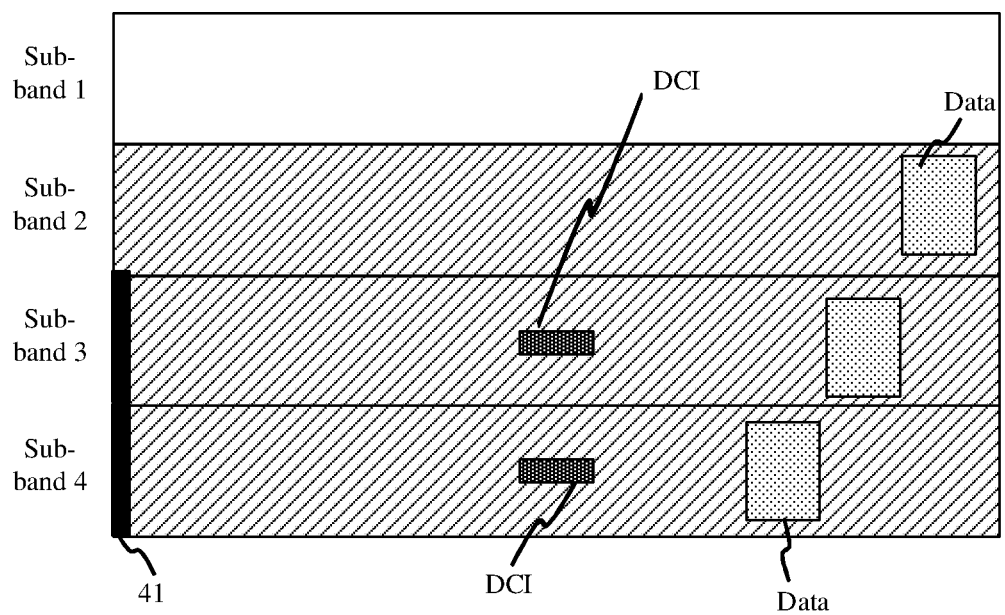
FIG. 10 is a schematic diagram illustrating a method for receiving DCI according to an exemplary embodiment.

Referring to FIG. 10, it is assumed that the access network device configures four sub-bands for the terminal, and LBT is successful on the sub-band 2, the sub-band 3 and the sub-band 4, that is, the sub-band 2, the sub-band 3 and the sub-band 4 are not occupied, and the sub-band 1 is occupied. At this time, the access network device may determine the sub-band 3 and the sub-band 4 as the target sub-bands, and transmits the target sequence 41 on the first symbol of the sub-band 3 and the sub-band 4. The first symbol is the time domain position which is pre-determined by the communication protocol. The terminal is prepared to receive the DCI on the sub-band 3 and the sub-band 4 after the target sequence 41 is detected on the sub-band 3 and the sub-band 4. The access network device transmits the DCI on the sub-band 3 and the sub-band 4, and the terminal receives or transmits data on the sub-band 2, the sub-band 3 and the sub-band 4 according to the DCI after the DCI is received on the sub-band 3 and the sub-band 4.

In the above embodiment, the access network device determines the n target sub-bands from the k sub-bands on which LBT is successful, and transmits the target sequence on the n target sub-bands. The terminal can learn the n target sub-bands on which LBT is successful after the target sub-bands is detected by the terminal, and the terminal is prepared to receive the DCI only on the n target sub-bands, so that the access network device and the terminal only need to activate one BWP. At the same time, the access network device only needs to transmit the target sequence on the n target sub-bands, and the terminal only needs to perform blind detection for the PDCCH on the n target sub-bands, thereby effectively reducing the search times and the search power consumption of the terminal on the PDCCH, and avoiding unnecessary power and battery consumption of the terminal.

It should be noted that, the steps performed by the access network device in the above embodiments may be separately implemented as a DCI transmitting method by the access network device, and the steps performed by the terminal may be separately implemented as a DCI receiving method by the terminal.

The present disclosure also provides device embodiments corresponding to the above method embodiments. For details of the device embodiments, reference may be made to the above method embodiments.

Figure 11:
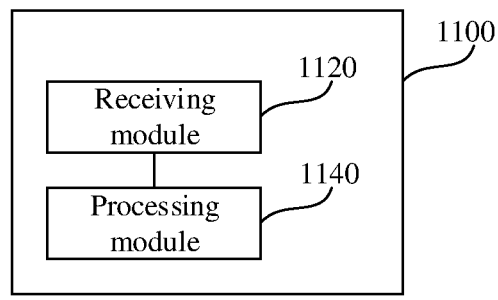
FIG. 11 is a block diagram illustrating a device for receiving DCI according to an exemplary embodiment.

FIG. 11 is a block diagram of a device 1100 for receiving DCI according to an exemplary embodiment. Each module in the device 1100 for receiving the DCI may be implemented as software, or hardware, or a combination of both. The device 1100 for receiving the DCI may include: a receiving module 1120 configured to receive BWP configuration information transmitted by an access network device, the BWP configuration information being used for configuring a target BWP which is located in an unlicensed spectrum and includes m sub-bands; and a processing module 1140 configured to determine, according to the BWP configuration information, a target BWP including m sub-bands, monitor a target sequence on the m sub-bands respectively, and monitor DCI on all or part of the m sub-bands after the target sequence is detected, m being a positive integer greater than 1.

In an embodiment, the m sub-bands are consecutive in the frequency domain.

In an embodiment, the processing module 1140 is configured to monitor the DCI on each of the m sub-bands.

In an embodiment, the processing module 1140 is configured to determine n target sub-bands on which the target sequence has been monitored, n being a positive integer not greater than m, and to monitor the DCI on at least one of the n target sub-bands. The target sequence is transmitted by the access network device on the target sub-bands on which LBT is successful, or the target sequence is transmitted by the access network device on a target sub-band transmitting the DCI.

In an embodiment, the receiving module 1120 is configured to receive a control resource set for the m sub-bands from the access network device. The processing module 1140 is configured to determine PDCCH search positions on the n target sub-bands according to the control resource set for the m sub-bands, the search positions on the n target sub-bands having different frequency domain positions and same time domain position, and to monitor the DCI at the PDCCH search positions.

In an embodiment, the processing module 1140 is configured to monitor the target sequence at a first time domain position on all or part of the m sub-bands respectively. The first time domain position is a time-frequency position which is pre-determined by a communication protocol, or the first time domain position is a time domain position which is pre-configured by the access network device during a procedure of configuring the target BWP.

In an embodiment, the BWP configuration information is semi-static configuration information.

Figure 12:
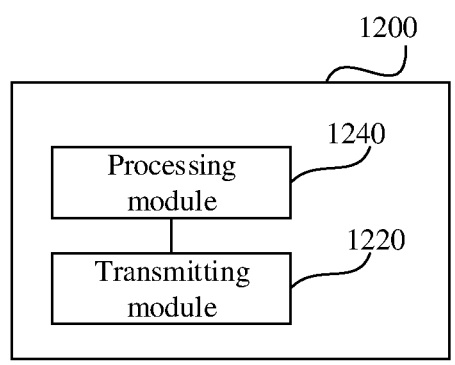
FIG. 12 is a block diagram illustrating a device for transmitting DCI according to an exemplary embodiment.

FIG. 12 is a block diagram of a device 1200 for transmitting DCI according to an exemplary embodiment. Each module in the device 1200 for transmitting DCI may be implemented as software, or hardware, or a combination of both. The device 1200 for transmitting DCI may include: a transmitting module 1220 configured to transmit BWP configuration information to a terminal, the BWP configuration information being used for configuring a target BWP which is located in an unlicensed spectrum and includes m sub-bands; and a processing module 1240 configured to perform LBT on the m sub-bands and determine n target sub-bands according to a LBT result. The transmitting module 1220 is further configured to transmit a target sequence on the n target sub-bands, and transmit DCI to the terminal on all or part of the m sub-bands, m being a positive integer greater than 1, and n being a positive integer not greater than m.

In an embodiment, the m sub-bands are consecutive in the frequency domain.

In an embodiment, the processing module 1240 is configured to perform the LBT on the m sub-bands, and determine the n sub-bands on which the LBT is successful as the n target sub-bands.

In an embodiment, the processing module 1240 is configured to perform the LBT on the m sub-bands and determine k sub-bands on which the LBT is successful, and to determine n target sub-bands for transmitting the DCI from the k sub-bands.

In an embodiment, the transmitting module 1220 is configured to transmit the DCI to the terminal on each of the m sub-bands.

In an embodiment, the transmitting module 1220 is configured to transmit the DCI to the terminal on all or part of the n target sub-bands.

In an embodiment, the transmitting module 1220 is configured to transmit the DCI to the terminal on each of the n target sub-bands, the DCI being used for scheduling a time-frequency resource on the k sub-bands.

In an embodiment, the transmitting module 1220 is configured to transmit a control resource set for the m sub-bands to the terminal.

In an embodiment, the transmitting module 1220 is configured to transmit the target sequence at a first time domain position on the n sub-bands respectively. The first time domain position is a time-frequency position which is pre-defined by a communication protocol, or the first time domain position is a time domain position which is pre-configured by the access network device during a procedure of configuring the target BWP.

Each of the access network device and the terminal may include corresponding modules for performing various functions. Whether a function is performed in hardware or software may depend on the particular application and design constraints. Those skilled in the art may use different methods to implement the described functions for each particular application, but such implementation should not be considered to beyond the scope of the present disclosure.

Figure 13:
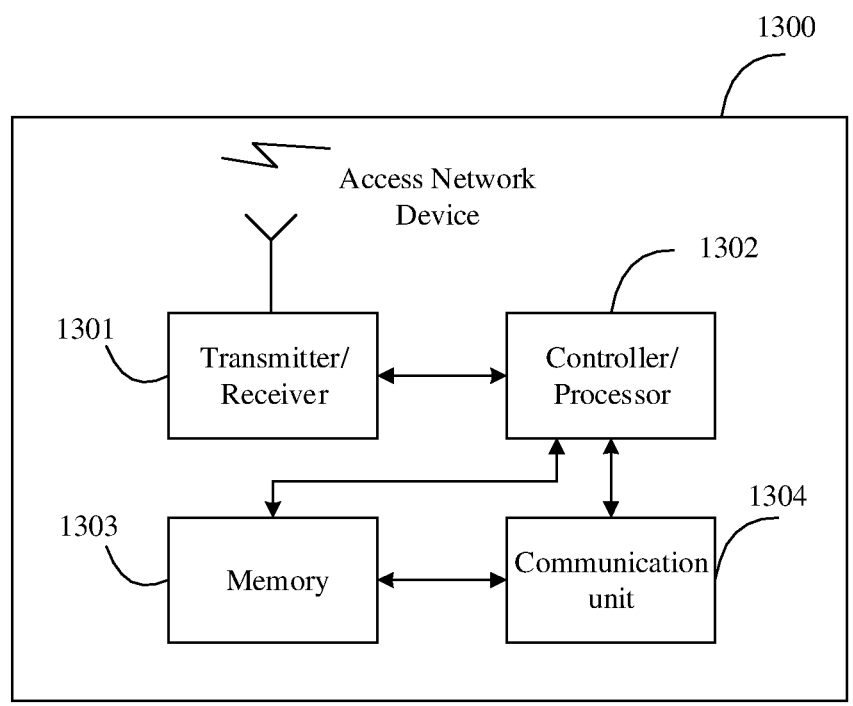
FIG. 13 is a schematic diagram illustrating an access network device according to an exemplary embodiment.

FIG. 13 is a schematic diagram illustrating an access network device 1300 according to an exemplary embodiment. The access network device 1300 includes a transmitter/receiver 1301 and a processor 1302. The processor 1302 may also be a controller. The transmitter/receiver 1301 is configured to support the transmission and reception of information between the access network device 1300 and the terminal in the above embodiments, and to support the communication between the access network device 1300 and other network entities. The processor 1302 performs various functions for communicating with the terminal. On the uplink, an uplink signal from the terminal is received via an antenna, demodulated by the receiver 1301 (e.g., demodulating a high frequency signal into a baseband signal), and further processed by the processor 1302 to recover the data and signaling message transmitted by the terminal. On the downlink, the data and signaling message are processed by the processor 1302, modulated by the transmitter 1301 (e.g., modulating a baseband signal into a high frequency signal) to generate a downlink signal, and transmitted to the terminal via an antenna. It should be noted that the demodulation or modulation function described above may also be performed by the processor 1302. For example, the processor 1302 is further configured to perform various steps on the access network device side in the above method embodiments, and/or other steps of the technical solution described in the embodiments of the present disclosure.

The access network device 1300 may further include a memory 1303 for storing instructions and data of the access network device 1300. In addition, the access network device 1300 may further include a communication unit 1304. The communication unit 1304 is configured to support the access network device 1300 to communicate with other network entities (for example, network device in the core network). For example, in the 5G NR system, the communication unit 1304 may be a NG-U interface for supporting the communication between the access network device 1300 and a UPF (User Plane Function) entity. Also for example, the communication unit 1304 may be an NG-C interface for supporting the communication between the access network device 1300 and an AMF (Access and Mobility Management Function) entity.

It should be understood that FIG. 13 illustrates only an example of the access network device 1300. In practical application, the access network device 1300 may include any number of transmitters, receivers, processors, controllers, memories, communication units, and the like.

Figure 14:
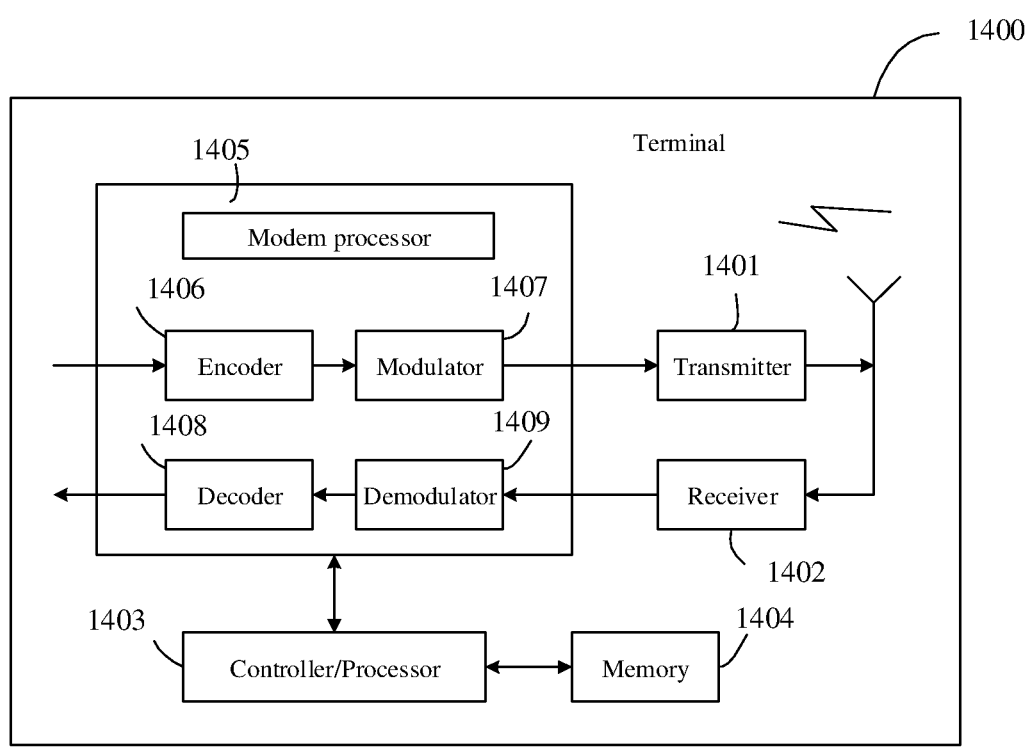
FIG. 14 is a schematic diagram illustrating a terminal according to an exemplary embodiment.

FIG. 14 is a schematic diagram illustrating a terminal 1400 according to an exemplary embodiment. The terminal 1400 includes a transmitter 1401, a receiver 1402, and a processor 1403. The processor 1403 may also be a controller. The terminal 1400 may further include a modem processor 1405. The modem processor 1405 may include an encoder 1406, a modulator 1407, a decoder 1408, and a demodulator 1409.

In an embodiment, the transmitter 1401 regulates (for example, analog converts, filters, amplifies, and upconverts, etc.) the output samples and generates an uplink signal that is transmitted via an antenna to the access network device. On the downlink, the antenna receives the downlink signal transmitted by the access network device. The receiver 1402 regulates (for example, filters, amplifies, downconverts, digitizes, etc.) the signal received from the antenna and provides input samples. In the modem processor 1405, the encoder 1406 receives the data and signaling message to be transmitted on the uplink, and processes (for example, formats, encodes, and interleaves) the data and signaling message. The modulator 1407 further processes (for example, symbol maps and modulates) the encoding business data and signaling message, and provides output samples. The demodulator 1409 processes (for example, demodulates) the input samples and provides symbol estimation. The decoder 1408 processes (for example, deinterleaves and decodes) the symbol estimation and provides decoded data and signaling message transmitted to the terminal 1400. The encoder 1406, the modulator 1407, the demodulator 1409, and the decoder 1408 may be implemented by the modem processor 1405. These units are processed according to the radio access technologies employed by the radio access network (for example, access technologies of 5G and other evolved systems). It is to be noted that when the terminal 1400 does not include the modem processor 1405, the above functions of the modem processor 1405 may be performed by the processor 1403.

The processor 1403 controls and manages the operation of the terminal 1400. For example, the processor 1403 is further configured to perform various steps of the terminal described above.

The terminal 1400 may further include a memory 1404 for storing instructions and data for the terminal 1400.

It is to be understood that FIG. 14 illustrates only an example of the terminal 1400. In practical applications, terminal 1400 may include any number of transmitters, receivers, processors, modem processors, memories, and the like.

In an embodiment, there is further provided a non-transitory computer readable storage medium having stored thereon instructions that, when executed by the processor of the access network device, cause the access network device to perform the DCI transmitting method on the access network device side as described above.

In an embodiment, there is further provided a non-transitory computer readable storage medium having stored thereon instructions that, when executed by the processor of the terminal, cause the terminal to perform the DCI receiving method on the terminal side as described above.

Other embodiments of the present disclosure will be apparent to those skilled in the art from consideration of the specification and practice of the disclosure disclosed herein. This application is intended to cover any variations, uses, or adaptations of the application following the general principles thereof and including such departures from the present disclosure as come within known or customary practice in the art. It is intended that the specification and examples be considered as exemplary only, with a true scope and spirit of the application being indicated by the following claims.

It is to be understood that the present disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A method for receiving downlink control information (DCI), the method being performed by a terminal and comprising:
 receiving bandwidth part (BWP) configuration information transmitted by an access network device, the BWP configuration information configuring a target BWP located in an unlicensed spectrum and comprises m sub-bands, m being a positive integer greater than 1;
 determining the m sub-bands of the target BWP according to the BWP configuration information;
 monitoring a target sequence at a first time domain position on all or part of the m sub-bands respectively, wherein the first time domain position is one of a time-frequency position pre-determined by a communication protocol, or a time domain position pre-configured by the access network device during a procedure of configuring the target BWP; and the target sequence is configured to identify sub-bands on which Listen Before Talk (LBT) is successful in the m sub-bands, or to identify sub-bands on which the DCI is transmitted in the m sub-bands; and
 monitoring DCI on all or part of the m sub-bands after the target sequence is detected.

2. The method of claim 1, wherein monitoring the DCI on all or part of the m sub-bands comprises:
 monitoring the DCI on each of the m sub-bands.

3. The method of claim 1, wherein monitoring the DCI on all or part of the m sub-bands comprises:
 determining n target sub-bands on which the target sequence is detected, n being a positive integer not greater than m; and
 monitoring the DCI on at least one of the n target sub-bands;
 wherein the target sequence is transmitted by the access network device on the target sub-bands when the LBT is successful, or on a target sub-band transmitting the DCI.

4. The method of claim 3, further comprising:
 receiving a control resource set for the m sub-bands from the access network device;
 wherein monitoring the DCI on at least one of the n target sub-bands comprises:
  determining physical downlink control channel (PDCCH) search positions on the n target sub-bands according to the control resource set for the m sub-bands, the PDCCH search positions on the n target sub-bands having different frequency domain positions and same time domain position; and
  monitoring the DCI at the PDCCH search positions.

5. The method of claim 1, wherein the BWP configuration information is semi-static configuration information.

6. The method of claim 1, wherein the m sub-bands are consecutive in a frequency domain.

7. A method for transmitting downlink control information (DCI), the method being performed by an access network device and comprising:
 transmitting bandwidth part (BWP) configuration information to a terminal, the BWP configuration information configuring a target BWP located in an unlicensed spectrum and comprises m sub-bands, m being a positive integer greater than 1;

performing Listen Before Talk (LBT) on the m sub-bands, and determining n target sub-bands according to a LBT result, n being a positive integer not greater than m;

transmitting a target sequence at a first time domain position on the n target sub-bands respectively, wherein the first time domain position is one of a time-frequency position pre-determined by a communication protocol, or a time domain position pre-configured by the access network device during a procedure of configuring the target BWP; and the target sequence is configured to identify sub-bands on which the LBT is successful in the m sub-bands, or to identify sub-bands on which the DCI is transmitted in the m sub-bands; and transmitting DCI to the terminal on all or part of the m sub-bands.

8. The method of claim 7, wherein determining the n target sub-bands according to the LBT result further comprises:

determining n sub-bands on which the LBT is successful as the n target sub-bands.

9. The method of claim 7, wherein determining n target sub-bands according to a LBT result further comprises:

determining k sub-bands on which the LBT is successful, k being a positive integer not greater than m; and determining the n target sub-bands for transmitting the DCI from the k sub-bands.

10. The method of claim 8, wherein transmitting the DCI to the terminal on all or part of the m sub-bands comprises:

transmitting the DCI to the terminal on each of the m sub-bands.

11. The method of claim 8, wherein transmitting the DCI to the terminal on all or part of the m sub-bands comprises:

transmitting the DCI to the terminal on all or part of the n target sub-bands.

12. The method of claim 9, wherein transmitting the DCI to the terminal on all or part of the m sub-bands comprises:

transmitting the DCI to the terminal on each of the n target sub-bands, the DCI being configured to schedule a time-frequency resource on the k sub-bands.

13. The method of claim 7, further comprising:

transmitting a control resource set for the m sub-bands to the terminal.

14. The method of claim 7, wherein the m sub-bands are consecutive in a frequency domain.

15. An access network device, comprising:

a processor; and a memory for storing instructions executable by the processor;

wherein the processor is configured to perform the method for transmitting the DCI of claim 7.

16. A terminal, comprising:

a processor; and a memory for storing instructions executable by the processor;

wherein the processor is configured to:

receive bandwidth part (BWP) configuration information transmitted by an access network device, the BWP configuration information configuring a target BWP located in an unlicensed spectrum and comprises m sub-bands, m being a positive integer greater than 1;

determine the m sub-bands of the target BWP according to the BWP configuration information;

monitor a target sequence at a first time domain position on all or part of the m sub-bands respectively, wherein the first time domain position is one of a time-frequency position pre-determined by a communication protocol, or a time domain position pre-configured by the access network device during a procedure of configuring the target BWP; and the target sequence is configured to identify sub-bands on which Listen Before Talk (LBT) is successful in the m sub-bands, or to identify sub-bands on which the DCI is transmitted in the m sub-bands; and monitor DCI on all or part of the m sub-bands after the target sequence is detected.

* * * * *